United States Patent [19]

Lutkie et al.

[11] Patent Number: 5,239,917
[45] Date of Patent: Aug. 31, 1993

[54] OVEN

[75] Inventors: Michael A. Lutkie; Charles J. Lutkie; Gary V. Riley, all of Wichita, Kans.; Thomas L. Cox, Tulsa, Okla.

[73] Assignee: Genie Tech, Inc., Wichita, Kans.

[21] Appl. No.: 711,021

[22] Filed: Jun. 6, 1991

[51] Int. Cl.$^5$ .............. A23L 3/00; A47J 37/08; A21B 1/00; F27B 9/06
[52] U.S. Cl. .................. 99/443 C; 99/386; 126/21 A; 219/388
[58] Field of Search .......... 126/21 R, 21 A, 77; 99/476, 477, 386, 325, 443 C, 470; 219/400, 388; 34/212, 216, 218, 223; 165/59, 60; 312/236

[56] References Cited

U.S. PATENT DOCUMENTS

| | | |
|---|---|---|
| 1,662,847 | 3/1928 | Cook ................ 99/443 C |
| 3,221,983 | 12/1963 | Trickler et al. .............. 230/127 |
| 3,398,866 | 4/1965 | La Flame et al. ............. 222/333 |
| 3,659,579 | 5/1972 | Henderson ................ 126/21 A |
| 3,678,244 | 7/1972 | Worline .................. 99/443 C |
| 3,693,452 | 9/1972 | McGinley ................. 99/443 C |
| 3,736,860 | 6/1973 | Vischer ...................... 219/388 |
| 3,802,832 | 4/1974 | Nicolaus ................... 99/443 C |
| 3,889,099 | 6/1975 | Nuss ........................ 126/21 A |
| 3,908,533 | 9/1975 | Fagerstrom et al. ........ 99/386 |
| 4,132,216 | 1/1979 | Guibert .................... 126/21 A |
| 4,154,861 | 5/1979 | Smith ......................... 426/466 |
| 4,283,614 | 8/1981 | Tanaka ..................... 126/21 A |
| 4,289,792 | 9/1981 | Smith ......................... 426/241 |
| 4,377,109 | 3/1983 | Brown et al. ............... 99/401 |
| 4,419,049 | 12/1983 | Gerboth et al. ............. 415/206 |
| 4,421,018 | 12/1983 | Pryputsch et al. ......... 99/447 |
| 4,455,924 | 6/1984 | Wenzel ..................... 126/21 A |
| 4,462,383 | 7/1984 | Henke et al. ............... 126/21 |
| 4,471,750 | 9/1984 | Burtea ........................ 126/21 |
| 4,503,760 | 3/1985 | Pryputsch et al. ........ 99/447 |
| 4,510,854 | 4/1985 | Robertson ............... 126/21 A |
| 4,520,575 | 6/1985 | Holmes et al. ............ 34/155 |
| 4,523,391 | 4/1985 | Smith et al. ................ 34/225 |
| 4,549,055 | 10/1985 | Kohler ................... 219/10.55 |
| 4,549,848 | 6/1985 | Wallman ................ 415/206 |
| 4,556,043 | 12/1985 | Bratton .................. 126/21 |
| 4,561,420 | 12/1985 | Thomsen ................. 126/77 |
| 4,576,090 | 3/1986 | Burtea ..................... 99/443 |
| 4,626,661 | 12/1986 | Henke ...................... 219/400 |
| 4,635,615 | 1/1987 | Itoh ......................... 126/21 A |
| 4,719,332 | 1/1988 | Markuson ............... 219/400 |
| 4,750,276 | 6/1988 | Smith ....................... 99/477 |
| 4,796,600 | 1/1989 | Hurley .................... 126/21 R |
| 4,865,610 | 9/1989 | Kett ........................ 126/21 R |
| 4,884,554 | 12/1989 | Yanagida ................ 126/21 R |
| 4,947,741 | 8/1990 | Gongwer .................. 99/443 C |
| 5,025,775 | 6/1991 | Crisp ....................... 126/21 A |

FOREIGN PATENT DOCUMENTS 2639424 11/1988 France ..................... 312/236

Primary Examiner—Harvey C. Hornsby
Assistant Examiner—Terrence R. Till
Attorney, Agent, or Firm—Head & Johnson

[57] ABSTRACT

An oven for heating food which includes a tray to support the food, the tray having a plurality of openings therethrough. A first heat source is spaced from and above the food. At least one plate having a plurality of openings therethrough is capable of absorbing heat from the first heat source and radiating heat. A fan spaced from and above the plate and the first heat source delivers air past the plate and past the first heat source onto the food. A second heat source beneath the tray also provides heat to the food.

3 Claims, 4 Drawing Sheets

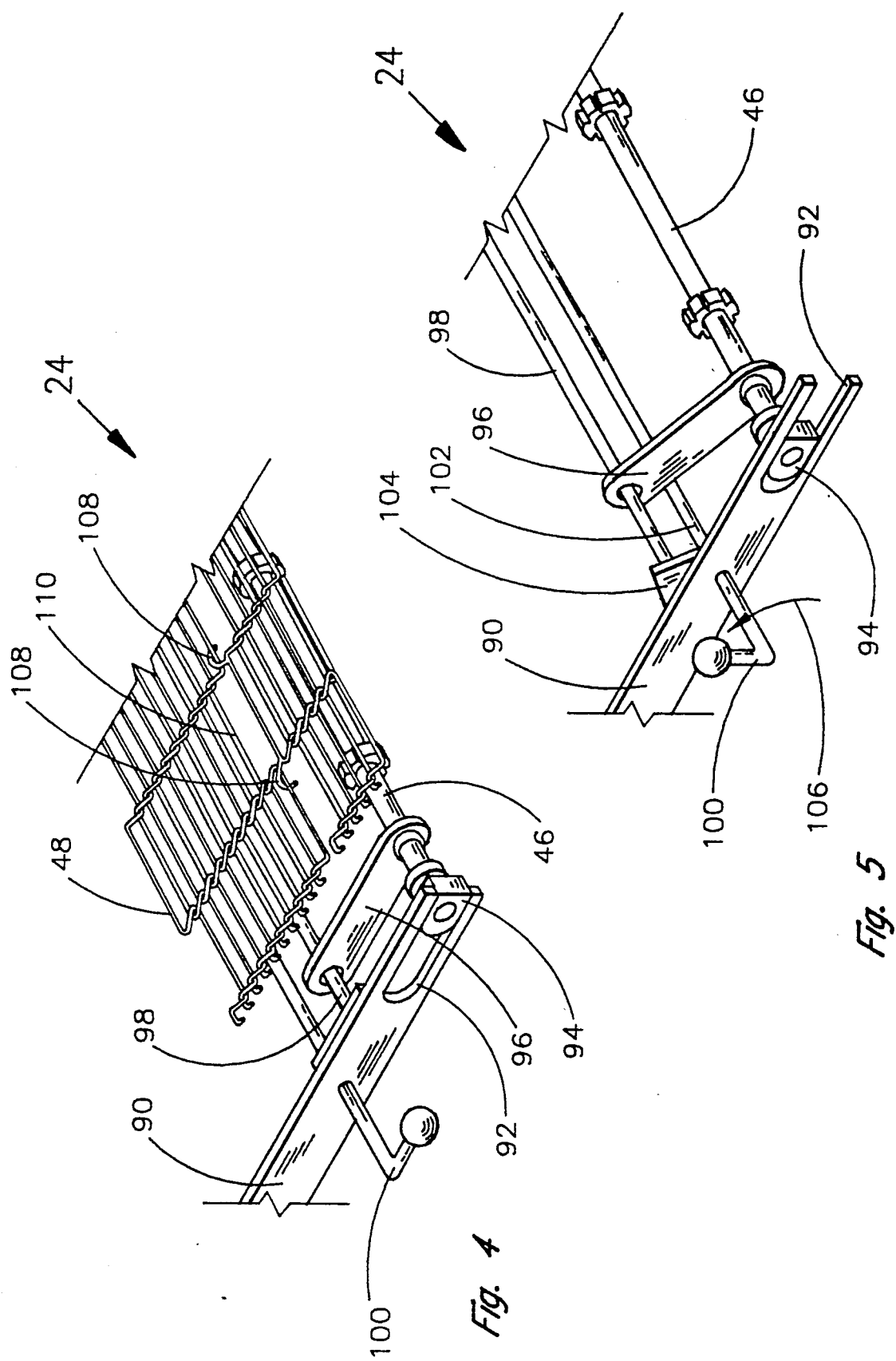

OVEN

BACKGROUND OF THE INVENTION

1. Field of the Invention

The present invention is directed to a food oven which utilizes both convection and conduction of hot air.

2. Prior Art

Ovens which heat by convection of hot air as well as by conduction of hot air are widely utilized, including in commercial food preparation.

Conduction occurs by heat radiating from a heat source above, below, or both above and below the food within the oven.

Convection is accomplished by circulating hot air past a heat source through use of a fan which circulates the air through the oven.

In order to improve the output of these ovens, a conveyer mechanism is sometimes incorporated. The uncooked food is placed at one end of the conveyer. The conveyer drive mechanism is timed so that after passing through the oven, the food is fully cooked. The conveyer, which may include a continuous belt, must be constructed so that it may be periodically removed for cleaning or maintenance.

A goal for commercial food preparation ovens is to reduce the cooking time to a minimum and increase the throughput rate to maximize the quantity of food cooked.

In order to maximize production, high heat within the oven is desirable. If the convection fan is downstream of the heat source, the fan is subject to extremely high heat which strains and wears the fan. Additionally, the fan motor and oven controls should be shielded from extreme heat. A further concern in commercial ovens is to prevent burn injuries to employees. While insulation may be utilized around the walls of the cooking chamber, the temperature may still become excessive.

Prior art patents illustrate various features of existing ovens. Smith (U.S. Pat. No. 3,884,213) discloses a microwave oven having heating elements upstream from a fan which delivers hot air to columnar heat transfer jets.

Riech (U.S. Pat. No. 3,933,145) discloses a barbecue device having a fan which forces air beneath a basin for holding coals and then upward toward the food grill.

Howe (U.S. Pat. No. 4,420,679) discloses an oven having a pivotal inner baffle door and a fan to circulate air downstream of a heating source.

Burtea (U.S. Pat. No. 4,576,090) provides an oven wherein heated air is drawn past a burner tube by a fan blower downstream of the burner and then directed to perforated plates.

Smith et al. (U.S. Pat. No. 4,750,276) provides an axial fan downstream of heating elements providing convection flow of hot air onto food.

Hanke et al. (U.S. Pat. No. 4,462,383) provides an impeller fan downstream of a heat source which forces heated air into a plenum for focusing heat on the food. An adjusting mechanism is provided at one end of a conveyer frame for adjusting tension of a wire link belt.

It is a principal object and purpose of the present invention to provide an oven wherein the temperature delivered to the food is at an optimum while the temperature of the oven controls and other components is reduced.

It is a further object and purpose of the present invention to provide an oven with a conveyer mechanism whereby the conveyer may be disassembled and reassembled for periodic cleaning without use of tools.

It is a further object and purpose of the present invention to provide a cooling shell around the exterior of the cooking chamber and about the controls.

SUMMARY OF THE INVENTION

The oven of the present invention has a cooking chamber forming an enclosed chamber having an entry opening and an exit opening.

A control panel contain various controls for the oven, such as a power switch, a temperature control, a speed control for a conveyer and other controls.

A conveyer mechanism acts as a support or tray for food to be cooked. The food will be drawn into and through the cooking chamber and then exit through the exit opening onto a series of aligned free rollers.

Within the cooking chamber, a fan is driven by an axial shaft. The shaft extends through the top of the cooking chamber and is rotated by a motor above and on top of the cooking chamber.

The fan rotates and forces air past a heat source such as an upper heating element. As the air is forced past the heating element, it is heated.

Above and below the upper heating element are metal plates having a plurality of openings therethrough. Plates absorb heat from the upper heating element and radiate heat outward.

The high velocity stream of heated air proceeds onto the food which is supported by the conveyer mechanism. The conveyer includes a drive sprocket and an idler sprocket around which moves a continuous belt, juxtaposed between the belt is a lower heating element. Conduction heat from the lower heating element moves upward through openings in the continuous belt onto the bottom of the food product.

Heated air delivered from the upper heating element onto the food moves across the food and then outward toward the walls of the cooking chamber. The air will then circulate upward outside of a fan shield and then return to the fan. The air within the cooking chamber thus circulates and is reheated as it passes the upper heating element and accompanying plates.

Opposing sidewalls of the cooking chamber are detachable from the oven. The sidewalls are suspended and hang from extending bars.

Above the cooking chamber, a chamber is formed for the motor and controls for the oven. This control chamber is kept cool by circulation of ambient air through use of a series of cooling fans.

Ambient air brought into the control chamber is dispersed through three exhaust passageways.

A pair of removable shells is suspended by a pair of cross bars. Each shell has an extending lip that rests on the cross bar. The two shells are in communication with two of the exhaust passageways of the control chamber. The third exhaust passageway connects to a front chamber spaced from the cooking chamber.

Accordingly, an air cooled shell is provided around the top, two of the sides and the front of the cooking chamber of the oven.

The conveyer mechanism includes a frame having a pair of parallel opposed arms. Each arm extends outward and terminates in a slot. The idler shaft terminates at each end in a block, each of the blocks being slidably received in one of the slots. Accordingly, as the blocks within the slots, the idler shaft will be retracted or extended.

Extending radially from the idler shaft is a cam. The radial end of the cam has an opening through which extends a cam shaft. The cam shaft is parallel to and spaced from the idler shaft. The radial end of the cam shaft may be caused to move in a radial direction by a handle which moves a handle shaft having an extending leg to which the cam shaft is attached.

The belt may thus be loosened and removed without use of any tools.

BRIEF DESCRIPTION OF THE DRAWINGS

FIG. 4 is a partial view of a conveyer mechanism utilized in the oven shown in FIG. 1; and FIG. 5 is a partial view of a conveyer mechanism shown in FIG. 4.

DETAILED DESCRIPTION OF THE PREFERRED EMBODIMENTS

Figure 1:
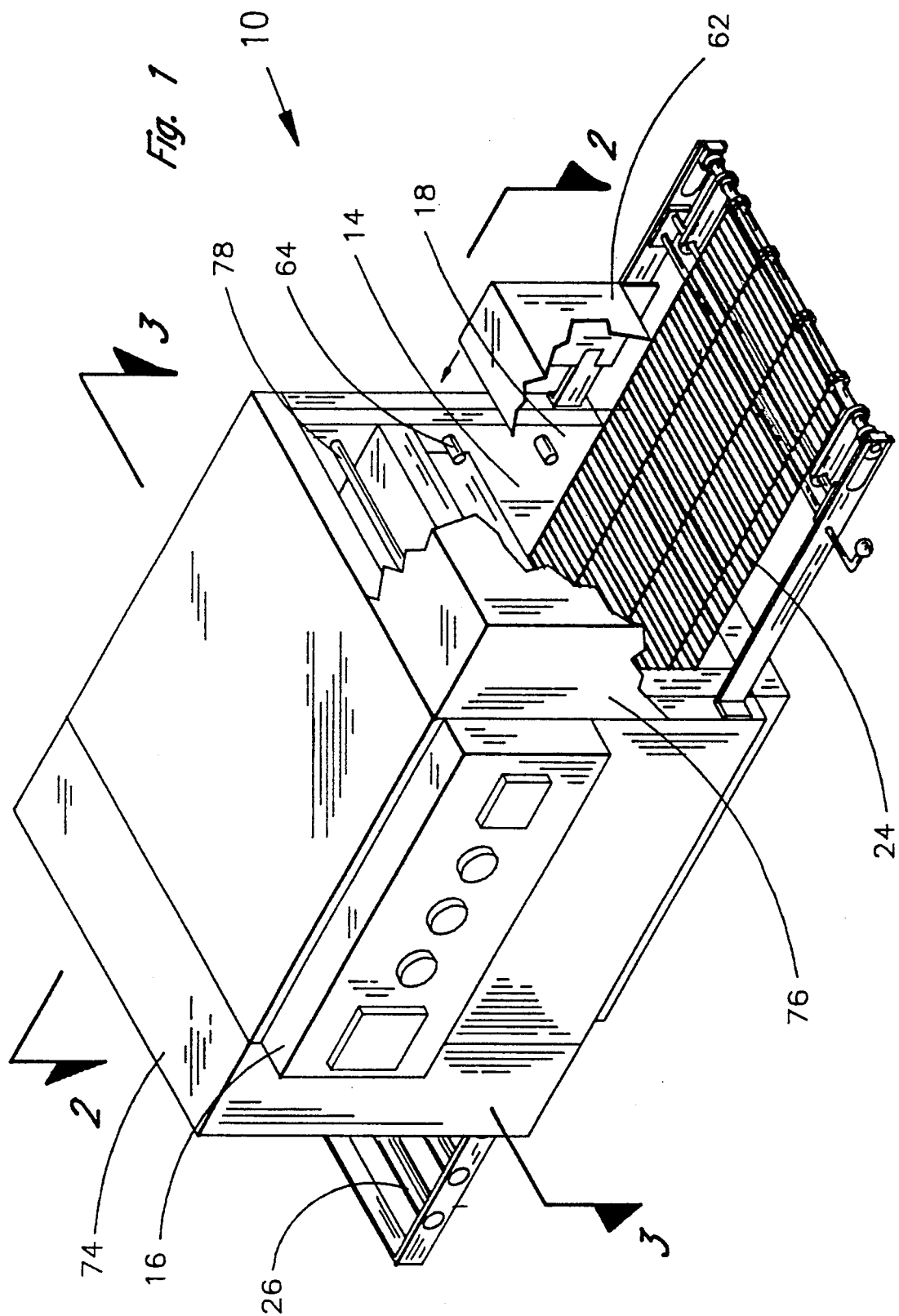
FIG. 1 is a perspective view illustrating an oven constructed in accordance with the present invention having portions cut away for ease of viewing.

Referring to the drawings in detail, FIG. 1 illustrates a perspective view of an oven 10 having portions cut away for ease of viewing. The food cooking area within the oven forms a cooking chamber 14 as will be described in detail herein.

A control panel 16 contains various controls for the oven, such as a power switch, a temperature control, a speed control for the conveyer, and other controls, all as are well known in the art.

The cooking chamber forms an enclosed chamber having an entry opening 18 and an exit opening 20 (not seen in FIG. 1).

A conveyer mechanism 24 acts as a support or tray for food (not shown) to be cooked. The food will be drawn into and through the cooking chamber and then exit through the exit opening onto a series of aligned free rollers 26. The conveyer mechanism may be powered by a variable speed conveyer motor (not shown).

An oven with a conveyor mechanism as shown in the preferred embodiments is primarily for commercial applications. It will be understood that a traditional food tray accessed by an oven door might be utilized for residential home use.

Figure 2:
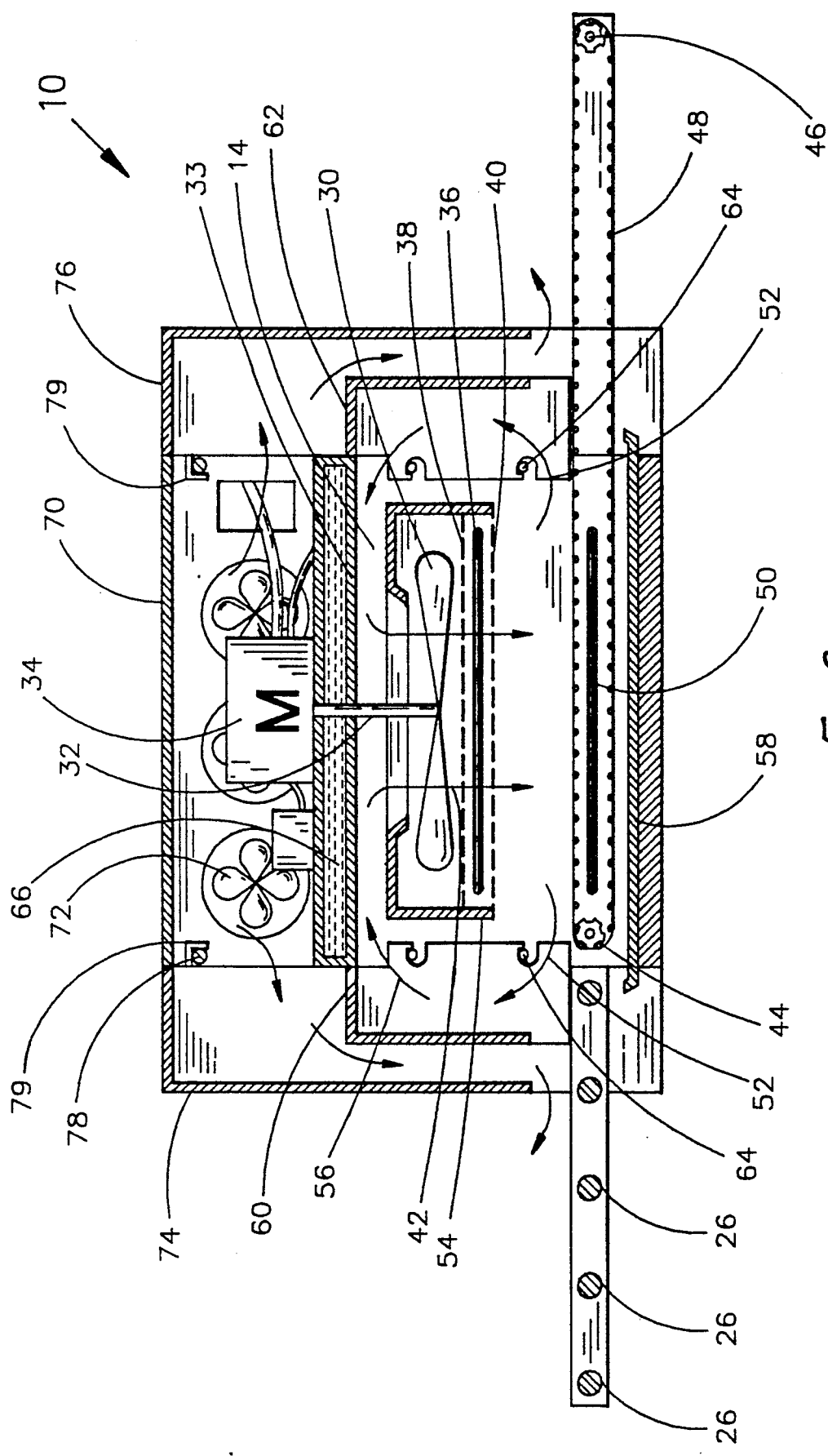
FIG. 2 is a sectional view taken along section line 2—2 of FIG. 1.

FIG. 2 is a sectional view taken along section line 2—2 of FIG. 1. Within the cooking chamber 14, a fan 30 is driven by an axial shaft 32. The shaft 32 extends through the top 33 of the cooking chamber. The shaft is, in turn, rotated by a motor (represented by the symbol "M") 34 which is outside the cooking chamber 14, above and on top of the cooking chamber 14.

The fan 30 rotates and forces air within the cooking chamber onto and past a heat source such as an upper heating element 36. The heating element would be connected to an alternating current electric service. While an electric heating element is utilized in the present embodiment, it will be understood that gas or other types of heat sources might also be utilized. As the air is forced past the heating element, it is heated.

Both above and below the upper heating element 36 are metal plates 38 and 40 which have a plurality of openings therethrough. The plates allow air to pass therethrough. Additionally, the plates absorb heat from the upper heating element and radiate heat outward. While a pair of parallel plates has been employed in the present embodiment, a single plate might be used. Arrows 42 indicate the direction of air from the fan.

The high velocity stream of heated air proceeds onto the food product (not shown) which is supported by the conveyer mechanism 24. The conveyer includes a drive shaft 44 having sprockets and an idler shaft 46 having sprockets around which moves a continuous belt 48. Juxtaposed between layers of the belt is a lower heating element 50. The lower heating element would be connected to an alternating current electric service. While an electric heating element is used in the present embodiment, it will be understood that gas or other types of heat sources might also be utilized. Conduction heat from the lower heating element 50 moves upward through openings in the continuous belt 48 onto the bottom of the food product.

Returning to a consideration of the heated air delivered from the upper heating element 36 onto the top of the food product, the hot air will move across the food product and then outward toward the walls of the cooking chamber 14 as shown by arrows 52. The air will circulate upward outside of a fan shield 54 as indicated by arrows 56 and then return to the fan. It will, thus, be seen that the air within the cooking chamber 14 circulates and is reheated as it passes the upper heating element 36 and plates. The fan 30 is located at the coolest position with respect to the circulating air within the cooking chamber.

It has been found that the foregoing arrangement of circulating air past the upper heating element and providing heat from the lower heating element allows a significant reduction in the cooking time for certain foods such as pizza.

The oven 10 might also include a catch pan 58 beneath the conveyor mechanism 24.

Opposing sidewalls 60 and 62 of the cooking chamber 14 are detachable from the oven. The sidewalls 60 and 62 are suspended and hang from bars 64. Each sidewall has a pair of notches onto which a pair of parallel bars 64 will rest. These sidewalls may be easily removed by restaurant or institutional attendants without the use of tools.

Above the cooking chamber 14 a layer of insulation 66 is provided. Above the insulation, a chamber is formed for the motor 34 and controls for the oven. The control chamber 70 is kept cool by circulation of ambient air through use of a series of cooling fans 72. Three fans are utilized in the present embodiment, although a greater or lessor number might be employed. The control chamber 70 has three exhaust passageways, two of which are visible in FIG. 2. Ambient air brought into the control chamber is, thus, disbursed through the three exhaust passageways.

A pair of removable cooling shells 74 and 76 is suspended by a pair of cross bars 78. Each shell has an extending lip 79 that rests on the cross bar. Each of the shells may be easily removed by restaurant or institutional attendants without the use of tools.

Figure 3:
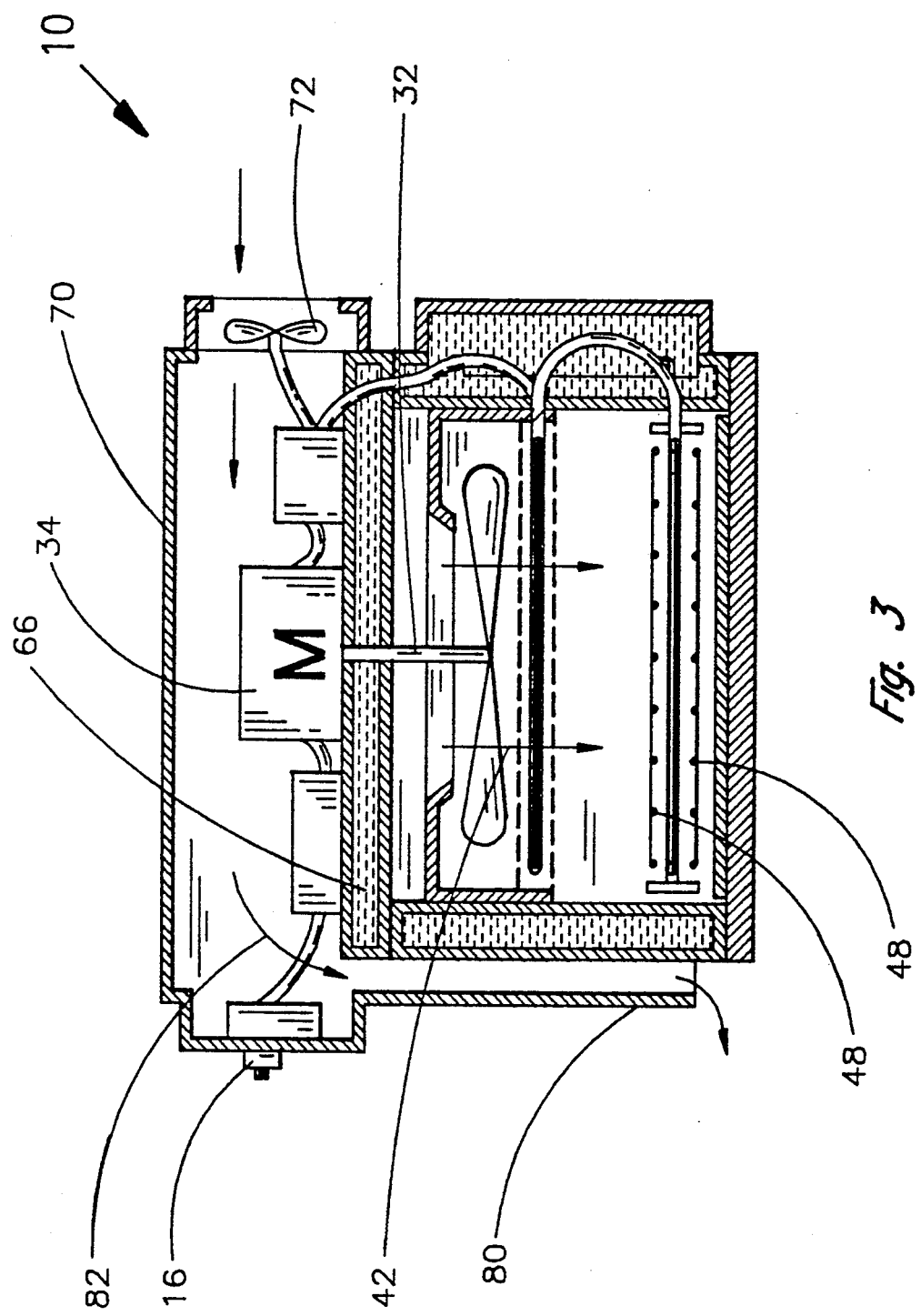
FIG. 3 is a sectional view taken along section line 3—3 of FIG. 1.

FIG. 3 is a sectional view of the oven 10 taken along section line 3—3 of FIG. 1. The third exhaust passageway is illustrated which connects to a front chamber 80 spaced from the cooking chamber 14. Arrow 82 shows the direction of ambient air passing from the control chamber 70 into the front chamber 80.

Accordingly, an air cooled shell is provided around the top, the two sides and front of the cooking chamber 14 of the oven 10. This air cooled shell serves to cool the fan motor and controls. This air cooled shell also serves to keep the surface temperature of the oven within acceptable range. As an example, the cooking temperature of the cooking chamber may range from 500°-550° F. while the skin temperature of the oven will be 100° F. or less.

FIG. 4 is a perspective view of a portion of the conveyer mechanism 24 showing a portion of the continuous belt 48.

The conveyer mechanism 24 includes a frame having a pair of parallel opposed arms 90 (only one visible in FIG. 4). Each arm extends outward and terminates in a slot 92. The idler shaft 46, about which the continuous belt 48 moves, terminates at each end in a block 94 (one block seen in FIG. 4). The blocks are slidably received within the slots. Accordingly, as the blocks 94 slide within the slots 92, the idler shaft 46 will move. The shaft will either be retracted toward the cooking chamber or extended.

Extending radially from the idler shaft is a cam 96. The radial end of the cam 96 has an opening through which extends a cam shaft 98, parallel to and spaced from the idler shaft. The radial end of the cam shaft may be caused to move in a radial direction by a handle 100 which moves a handle shaft 102 having an extending leg 104 to which the cam shaft 98 is attached. In FIG. 4, the handle 100 is in a position so that the idler shaft 46 is extended.

FIG. 5 also shows a view of a portion of the conveyer mechanism 24 with the continuous belt 48 removed. When the handle 100 is moved as shown by the arrow 106, the radial end of the cam 96 will move in an arc so that the idler shaft 46 is retracted. Once the idler shaft 46 is retracted, the continuous belt will be loosened.

The continuous belt may be removable for cleaning or for servicing. As best seen in FIG. 4, the belt 48 may contain a series of hooks 108 which engage master links 110. When the belt is loosened, the hooks 108 may be manually disengaged from the master links 110. The belt 48 may then be unthreaded from the conveyer mechanism. The belt may then be cleaned such as through a commercial dishwasher. The conveyer mechanism may also be easily serviced. It will be observed that the belt 48 may be loosened and removed without use of any tools.

To reinstall the belt 48, the reverse procedure is followed. The belt will be threaded around the sprockets of the shafts and then the hooks 108 engaged with links 110. The handle 100 may be moved in the opposite direction, rotating the handle shaft 102. The leg 104 will, in turn, be moved, moving the cam shaft 98 and the radial end of the cam 96. The idler shaft will thus be extended, tightening the belt 48.

Whereas, the present invention has been described in relation to the drawings attached hereto, it should be understood that other and further modifications, apart from those shown or suggested herein, may be made within the spirit and scope of this invention.

What is claimed is:

1. An oven for heating food, said oven comprising:
    a cooking chamber having at least a top, a front, and two detachable sides, each side having an opening therethrough for entry or exit of said food;
    a control chamber located above said top of said cooking chamber, said control chamber having a plurality of exhaust passageways;
    an external shell having a front member, and two detachable and removable side members, each side member having an opening therethrough for entry or exit of said food, said external shell shaped from and surrounding said front and sides of said cooking chamber for form a front passageway and a passageway for each said side in communication with said control chamber;
    detachable and removable suspension means to suspend said side shell members said cooking chamber detachable sides; and
    forced ambient air blower means to force ambient air into said control chamber and thereafter through said front passageway and through said side passageways to provide an air cooled shell around said cooking chamber wherein said external shell will be cool to the touch.

2. An oven for heating food as set forth in claim 1 wherein said control chamber includes oven controls which are cooled by said forced ambient air.

3. An oven for heating food as set forth in claim 1 wherein said sides of said cooking chamber are detachably connected to said cooking chamber by posts extending from said cooking chamber engaging with slots on said sides.

* * * * *